United States Patent [19]

Tomazic

[11] Patent Number: 4,615,108

[45] Date of Patent: Oct. 7, 1986

[54] PROCESS FOR THE MANUFACTURE OF BIPOLAR ELECTRODES AND SEPARATORS

[75] Inventor: Gerd Tomazic, Mürzzuschlag, Austria

[73] Assignee: Johnson Service Company, Milwaukee, Wis.

[21] Appl. No.: 777,702

[22] Filed: Sep. 19, 1985

Related U.S. Application Data

[63] Continuation-in-part of Ser. No. 683,635, Dec. 19, 1984, abandoned.

[30] Foreign Application Priority Data

Dec. 19, 1983 [AT] Austria .................................. 4426/83
Dec. 18, 1984 [EP] European Pat. Off. .......... 848902490

[51] Int. Cl.$^4$ ............................................. H01M 6/00
[52] U.S. Cl. ................................. 29/623.2; 29/623.1
[58] Field of Search ........................... 29/623.2, 623.1; 429/210

[56] References Cited

U.S. PATENT DOCUMENTS

4,152,825 5/1979 Bruneau ........................ 29/623.2

Primary Examiner—Charles F. LeFevour
Attorney, Agent, or Firm—John Phillip Ryan; Joseph J. Jochman, Jr.; Larry L. Shupe

[57] ABSTRACT

An electrochemical device having one or more cells, a bipolar carbon-plastic electrode element providing in combination a separator, cathode and anode, the cathode and anode each having a space formed therebetween, catholyte and anolyte electrolytes circulated from and to reservoirs therefor via distribution connector means to or from a feed or discharge orifice in the appropriate cathode space or anode space. The distribution connector means is provided with at least a configured offset pathways interconnecting feed or discharge channels and the cathode or anode orifices. The pathways of a connector can be interconnected by a cross-channel having a varying area cross-section whereby shunt current protection capabilities are provided so as to reduce or eliminate detrimental orifice blocking depositions. In one embodiment the cross channel can be provided by means having a constant cross section, but variable length. A variable length cross channel is provided by either arcuate interconnected channels having various arcuate lengths or it can be provided by separate arcuate hose-like members of the various lengths. The distribution connector means can be provided with bifurcated distribution channel means feeding it electrolyte. The bifurcated distribution channel means provide means for access into the battery whereby the battery's operating conditions and parameters can be sensed or the electrolyte can be tested or modified as the battery's operation dictates.

4 Claims, 15 Drawing Figures

PROCESS FOR THE MANUFACTURE OF BIPOLAR ELECTRODES AND SEPARATORS

This is a Continuation-in-Part of application Ser. No. 683,635, filed Dec. 19, 1984. now abandoned.

BACKGROUND OF THE INVENTION

1. Field of the Invention

The invention relates to an electrochemical cell, in particular a secondary cell, with systems for circulating electrolyte liquid, electrolyte suspension or the like, for example a zinc-bromine battery, and to a process for the manufacture thereof.

2. Description of the Prior Art

Electrochemical cells with circulating electrolyte liquid, such as zinc-bromine batteries which are generally representative of such cells, are illustrated in U.S. Pat. Nos. 4,105,829; 4,124,478; 4,277,317; 4,279,752, 4,285,794; 4,286,027; 4,312,735; 4,346,150; 4,377,445; 4,379,814; 4,396,689 and 4,400,448. It is desirable to design the electrochemical cell in such a way that the smallest possible spatial volume is required, with the catholyte and the anolyte being stored in their own reservoirs and being pumped through the battery's electrolyte systems by appropriate pumps, as for example by means of pumps having a common drive motor. Plastic materials have proved particularly suitable for both the separators and the electrodes, with the electrodes having portions containing, for example, plastic-bonded carbon, carbon filled plastic, graphite, carbon black activated carbon or the like. Electrodes of this kind are generally for the bipolar type of batteries.

A battery of this type is disclosed which has plastic separators and carbon-filled electrodes. In the separators, depressions are employed, which provide distribution channels for the electrolyte into and out of the electrode anode or cathode spaces. The electrodes and the separators are constructed of polypropylene, polyethylene or copolymers thereof and are operatively joined together generally either by means of a suitable adhesive material, plastic welding, heat sealing or thermal welding. The application of adhesive material is, however, extremely difficult to control in practice. An unduly small or an unduly large application of adhesive material must be avoided, since otherwise a sufficiently tight liquid connection is not formed or the distribution channels are blocked by any excess adhesive material, which can cause inadequate electrolyte flow to or from a cell. Thermal welding of the plastic components has proven to be a preferable method for joinder of electrodes and separators into cell elements or assemblages.

SUMMARY OF THE INVENTION

It is the object of the present invention to provide an electrochemical cell, in particular a secondary cell, preferably a zinc-bromine cell, which is particularly reliable in operation and in which the electrodes and/or the separators can be joined, for example by being adhesively bonded, plastic welded, heat sealed or thermal welded to one another in a liquid-tight manner and feeding and discharging of the electrolyte can be accomplished without impairment. It is a further object of the present invention to make it possible to select or design the electrical and electrolyte flow resistances of the feed and discharge lines independent of the structure of the electrochemical cell.

In the electrochemical cell according to the invention, in particular a secondary cell with systems for circulating electrolyte liquid, electrolyte suspension or the like, a multiplicity of preferably bipolar electrodes, in particular electrodes containing plastic-bonded carbon or the like, and a multiplicity of separators, are operatively joined, for example adhesively bonded or thermal welded, directly to one another in a liquid-tight manner generally in the region of their outer margins. Anode spaces and cathode spaces are thus formed between the joined electrodes and separators. Distribution channels formed within the joined electrodes and separators feed the appropriate electrolyte liquid to the appropriate anode or cathode spaces. It is to be understood that all the anode spaces are mutually connected and all of the cathode spaces are mutually connected, so as to permit electrolyte liquid to be conducted via the distribution channels to the respective anode spaces and cathode spaces. The distribution channels preferably are formed by means of depressions in the region of the electrode margins and/or separator margins and communicate with the anode spaces and cathode spaces. The essential feature is that each anode space and each cathode space is connected in a liquid-tight manner with the distribution channels providing for the feed and the discharge of the appropriate electrolyte liquid to and from the appropriate anode spaces or appropriate cathode spaces. The electrolyte feed and discharge is accomplished via at least one electrolyte feed orifice and at least one electrolyte discharge orifice to each of said spaces. The orifices penetrate the margins of the electrodes and/or separators with the orifice supporting margins extending essentially at right angles to the major active portions of the electrodes and/or the separators. Electrolyte is fed thereto via separate connectors through complementing orifices leading to the distribution channels. An electrochemical cell is thus provided in which it is possible to ensure a proper electrolyte flow and a reliable electrolyte feed and discharge. At the same time the electrochemical cell has a particularly small space requirement, and it can be produced in a very simple and reliable manner making possible a high energy density with uniform loading of the individual electrodes.

When each connector orifice is connected to one electrolyte transport channel in the connector, leading directly or indirectly into a main electrolyte feed or discharge channel, a design results which can have a particularly low flow resistance, whereby the pump energy losses through the connector become very small.

When the orifices of at least one connector for the feed and/or discharge of the electrolyte to and from the anode spaces and/or cathode spaces via the distribution channels are additionally connected to the main electrolyte feed or discharge channel via a cross channel, an undesirable deposition of zinc due to shunt currents, which can lead to orifices becoming blocked, can be avoided by the application of an electric current.

It has been found that if the connector cross channel has a cross-section of varying area, in particular in such a form that the cross-sectional area decreases up to the center of the cross channel and then increases towards each of its extremities, energy losses can be minimized, and at the same time undesired deposition of zinc in the feed channels becomes avoidable. It is to be understood that a connector cross-channel of a substantially constant cross-sectional area, as hereinafter described, may be used in some instances to attain substantially the same function.

When the flow channels in the connector are arranged in rows, in particular in two rows with an offset, connection to the particular electrolyte main feed or discharge channels is especially easy. If, for example, only two connectors are to be provided, one row can be associated with each of the anode spaces and the other row can be associated with each of the cathode spaces. These rows are in each case connected to their own electrolyte main feed or discharge channel.

Another embodiment of the connector cross channel comprises a series of individual interconnected arcuate channels. The arcuate channels span the feed and/or discharge orifices leading to or from anode and/or cathode spaces. The arcuate channels preferably have a constant cross-section, but can have differing or varying arcuate lengths. The arcuate length preferably increases toward the middle electrode spaces and decreases toward each of the connector extremities. Undesirable deposition of zinc can also be prevented in this manner. The electrical current applied in the cross channels can be provided with particular accuracy by means of the length assigned to the individual arcuate portions. If the individual arcuate portions are constructed from pieces of pipe, tubing or hoses, a particularly simple but accurate arcuate portion can be obtained. A simple connector construction can be provided by two part connectors having substantially mirror-like connection planes. The connector is penetrated by feed and/or discharge lines and has in at least a part of one of the connector planes configured arcuate recesses of approximately hemispherical or similar cross-section. A connector of this construction provides particularly favorable electrical resistance and electrolyte flow characteristics. It is adapted to being molded and fabricated from plastic, e.g., by injection molding processes or the like.

The electrolyte can be fed and discharged in a particularly advantageous manner when the feed or discharge orifices in the distribution channels have a rectangular cross-section and the connector channels have a complementing cross-section in the region adjoining or interfacing the orifice, and the connector channel merges into a circular cross-section interfacing or joining a feed or discharge channel.

When the feed or discharge orifices in the distribution channels are formed in the layer which surrounds the electrode and separator margins, a particularly simple design of the electrochemical cells results, since this layer provides a liquid-tight joint between the electrodes and separators.

When the outer layer or shell of the cell element is formed from the material of the electrodes and/or separators by fusion such as thermal welding, the joint is particularly easy to make and has outstanding leak-tightness characteristics.

When the outer layer or shell of the cell element is formed by enveloping the margins of the electrodes and separators, the margins of the electrodes or of the separators can be of any type, for example the electrode margin can be filled with carbon without involving the risk of an additional adverse effect on the battery, for example short-circuiting and the like.

A particularly simple production of the electrochemical cell is possible, if the connector, the joined electrodes and/or the separators assemblage have guide elements, in particular matching grooves and tongues, on their cooperating surfaces and are thereby fastened together.

One embodiment of the invention illustrates a channel connector connecting the main electrolyte feed or discharge channel and the connector internal distribution paths and cross channel as having a controllable connector opening leading into the internal portions of the channel connector. The controllable connector opening makes it possible to investigate the state of any particular anode space or cathode space without interfering with the operation of the battery. The controllable connector opening permits a thermocouple to be introduced into the electrolyte flow, the removal of electrolyte liquid samples or the exchange of specific electrolyte liquids, e.g., to remove gas bubbles and the like. The controllable channel opening permits the battery's operational state to be checked in various ways in a simple manner and, if necessary, to some extent permits corrections.

In the above described embodiment the channel connector leading directly or indirectly to the electrolyte feed or discharge channel is preferably angularly disposed. The controllable channel opening extends on a substantially straight line into the distribution paths within the connector, but joins the angularly disposed channel connector at a point intermediate its junction with the connector distribution paths. This substantially straight line controllable connector opening permits probes, hoses and the like to be introduced into the electrolyte system in a simple manner. The controllable channel opening can be very small in cross section. The controllable channel opening in the connector can be provided with a filler which in turn can provide one or more interconnected filler openings. The filler design provides means which meet both the liquid flow and electrical requirements of the battery in an advantageous manner. It is simple in form and outstandingly suitable for manufacture from plastics.

As previously described, the battery of the subject invention comprises a cell envelope or shell constructed from a multiplicity of bipolar electrodes made in part of a thermoplastic material. The bipolar electrodes comprise interior regions having electrochemical active substances separated by thermoplastic separators. The electrodes and separators are joined to one another at their margin portions and, if appropriate, include stiffening end plates. Initially, the electrodes, separators and any stiffening end plates as an assemblage are pressed or squeezed together and are continuously maintained in that condition while the margins thereof are melted by means of a heated plate, such as a metal platen. The heated plate is positioned adjacent to or in contact with the marginal portions of the electrode and separator assemblage to melt the same. The melted marginal portions while pressed together are then caused to solidify, preferably by the use of a coolant such as air. In the prior art batteries described earlier in this description, the cell components were bonded to one another and the assemblage of cell elements were maintained by means of tensioning screws or the like so as to provide a further seal during battery operation. Since both the electrodes and the separators can be constructed from material such as polypropylene and polypropylene and these materials are not particularly suitable for adhesive bonding due to their highly inert chemical composition, it became necessary when using adhesive as an added step to prepare the electrodes and separator surfaces to accommodate the adhesive. Preparation of the electrodes and the separators by this added step involved either etching, roughening, treatment by corona discharges or the like. It has been a continuing unsolved problem in the above described method as to how the bromine resistant components can be joined tightly together without, at the same time, having the adhesive material cause blockage of the narrow or fine channels in the electrolyte access channels provided in the separators or in the electrodes. It was a surprising and unexpected result that by the use of the above described heat sealing process an electrochemical cell could be produced which possesses requisite mechanical load bearing capacity and guarantees complete freedom from leaks.

An electrochemical cell having a particularly simple flowing of the electrolyte via reservoir and a connector can be obtained by having orifices penetrating the substantially transverse margins of the electrodes and/or separators. These margin orifices are closed before and during the melting of the margins with a peg-like filler. These peg fillers are coated with a release agent such as Teflon or the like. The use of peg fillers makes it possible to ensure that an access orifice leading from the marginal distribution channels to the anode and/or cathode spaces possesses a definite geometrical shape and will have a reproducible spacing suitable for mass production while guaranteeing a leak-tight cell connection.

It is possible if pipes or hoses of thermoplastic material are introduced into the cell element orifices before melting to effect a fusing in of the pipes or hoses by means of the heat plate or metal platen. The heat plate has accommodating orifices throughwhich the pipes or hoses are passed. These pipe or hose endings are connected into the connector which has a main electrolyte feed or discharge channel.

The heat sealing or heat fusion method used for the manufacture of the main electrochemical cell can also be used in the manufacture of a connector to the individual cathode and anode space. In this case a thermoplastic material is used for the connector component. The connector component has a multiplicity of mutually spaced preferably cylindrical recesses into which pipes or hoses of compatible thermoplastic material can be introduced. The thermoplastic material of the connector components and the pipes or hoses is then partially melted, preferably by means of a heat plate or metal platen. Maintaining pressure on the components while heating the same then causes the materials to melt and flow together and solidify. A connector manufactured in this way can be produced from a material which is substantially inert chemically. Such a material would be polypropylene. Preferably the hoses and pipes can be held at the desired mutual distances to provide the desired arcuate expanses and a perfect leak-tightness can be achieved because of the thermoplastic fusing of the materials.

In the above described heat fusion or melting processes and during the solidification period, the bores of the pipes and hoses are closed by filler pegs which are coated with a release agent such as Teflon. The filler pegs must be thermally inactive. By this means a connector can be produced from the materials contained therein at a low engineering cost which possesses a high precision.

DETAILED DESCRIPTION OF THE INVENTION

The zinc-bromine battery consists principally of three main components. The primary component is the voltaic cell or electrochemical system which consists of a multiplicity of electrodes and separators mutually connected in a liquid-tight manner. The electrodes are provided in a bipolar arrangement and essentially consist of plastic-bonded carbon material with surrounding or marginal frames of thermoplastic material. Due to the bipolar arrangement, one side of the electrode acts as a positive pole (cathode), or the bromine electrode, and the other side acts as a negative pole (anode), or the zinc electrode. Due to the thinness of the separator, the electrical resistance offered by the separator is minimized. The separator also acts as a diaphragm, that is to say as an effective barrier against the undesired transport of bromine to the zinc electrode from the cathode space and vice versa. The second essential component of the voltaic cell or electrochemical cell is the electrolyte which is composed of an aqueous zinc bromide solution and an organic complex former or agent for binding the elemental bromine. The electrolyte circulates through the system in two mutually separate circulations, a circulating system for the anolyte and a circulating system for the catholyte. For circulating the electrolyte, a further component of the electrochemical cell is provided comprising pump means and the reservoirs for the electrolyte.

During charge, bromine is generated at the cathode and reacts to form an organic bromine complex which, as a second liquid phase, enables the storage of the bromine. Due to the higher density, this bromine-rich complex phase separates from the remaining aqueous electrolyte solution in the catholyte reservoir. Thus, in the charged state, the reactant for the positive electrode is, for the most part, stored outside the electrochemical cell and does not enter into a reaction with the zinc. Losses due to self-discharge are thus greatly reduced and the battery can be stored without maintenance for extended periods. During charging, the anolyte is depleted of zinc since zinc is deposited in metallic form on the negative electrode.

During discharge, the bromine-rich complex phase is circulated to the passivated cathode as part of the catholyte, while the metallic zinc at the negative electrode or anode goes back into solution in the anolyte. The leakage currents or shunt currents caused by the bipolar electrode arrangement in series can be regarded as an inherent characteristic of the system. These leakage or shunt currents occur due to the electrolyte feed which takes place parallel to the individual cells via a common main line and lead to energy losses and non-uniform deposition of zinc (formation of dendrites). This effect becomes more pronounced with an increasing number of individual cells and, with respect to accumulation of zinc, has the greatest effect at the electrolyte feeds in the vicinity of the end negative electrode of the bipolar cell block. The normal electrolyte circulation is disturbed by the non-uniform deposition of zinc in the individual cells so that eventually the different behavior from one cell to another leads to inoperability of the battery or system.

The most effective measure to eliminate the shunt currents has proved to be an electrical circuit, in which a voltage of approximately the same magnitude as the terminal voltage is superimposed on the electrolyte lines. This voltage acts to eliminate the shunt current flow and thus reduces the formation of non-uniform deposition of zinc. This shunt current protection consumes very little energy and is taken directly from the battery or system output.

Figure 1:
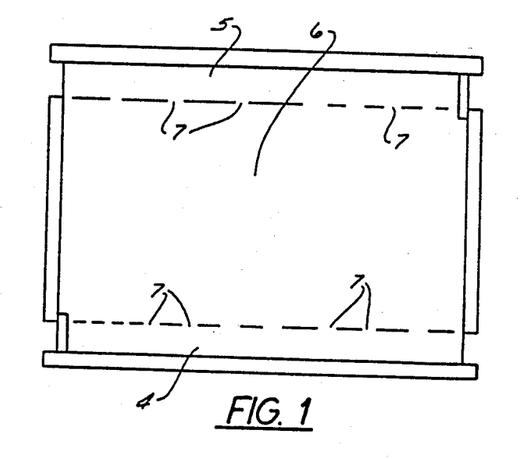
FIG. 1 is a plan view of a separator.
Figure 2:
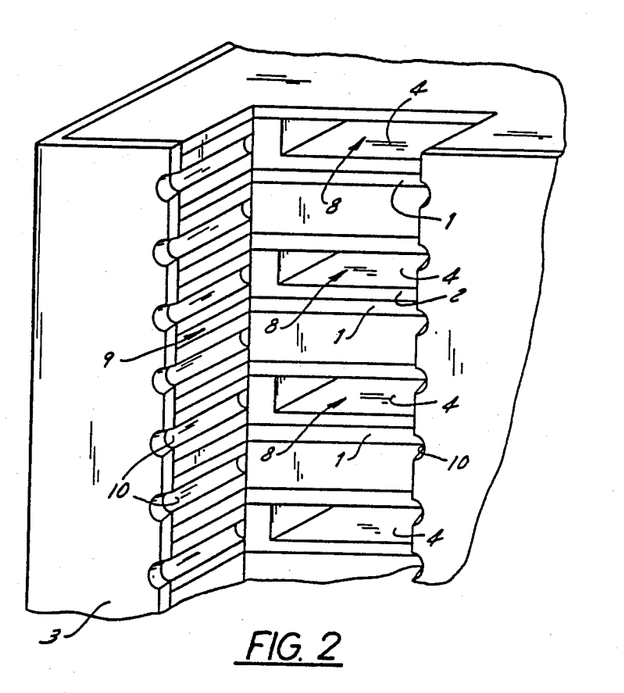
FIG. 2 is a partial detail view of several cells comprising in part a common envelope or shell formed by the joinder of marginal portions of electrodes and separators and has provided therein one of two recess means to accommodate an electrolyte connector.

FIG. 2 shows a detail of a voltaic or electrochemical cell which is constructed from individual electrodes 1 and separators 2. The electrodes and separators have a common envelope or shell 3 formed by joinder of the electrode and separator material generally at the marginal portions thereof. As can be seen from FIG. 1, the separator has a depression, by means of which distribution channels 4 and 5 are formed. In its central surface 6, access orifices 7 of different sizes and opening to either channel 4 or 5 are provided, so that uniform distribution of the electrolyte is ensured during both feeding and discharge of the electrolyte to and from the anode space or cathode space. The electrodes can either have a structure analogous to the separators, or it is also possible for the separators to be made substantially planar and only the electrodes to be made in the way described here, i.e. with the distribution channels formed therein. In any case, it must be ensured that, between the separator and the electrode, a space is formed or provided which is sufficient for access of the electrolyte and for the electrochemical reaction to occur and proceed.

As can be seen from FIG. 2, each electrode and separator pair has an orifice 8, one orifice for each of the distribution channels 4 and 5, which provide access to the separator and are substantially at right angles to the two-dimensional extent thereof. In the voltaic cell, a prismatic recess or notch 9 is provided which has grooves 10 in opposing faces thereof. A connector 11, best illustrated in FIG. 4, having tongues 12 can be inserted in a liquid-tight manner into this prismatic recess or notch 9 and engages the grooves 10. The connector, of which preferably four but at least two are provided depending on the system's design, can be shaped for connecting only every second electrolyte space. Either feed or discharge of the electrolyte to or from the anode space or cathode space then takes place through this connector 11. Each orifice 8 in the envelope 3 is associated with a connector channel 13, the channels 13 (cf. FIGS. 5) lead into a main electrolyte feed or discharge channel 14, which in turn is connected in a liquid-tight manner to the reservoir and the pump (not shown). A modified connector 11 is illustrated in FIG. 5B wherein the electrolyte connector channels 13 pass through a heat exchanger 31. The heat exchanger 31 has coolant feed orifice 32 and coolant discharge orifice 33 so that effective temperature control of the electrolyte fed to the operating cell will be at the optimum temperature possible.

Figure 3:
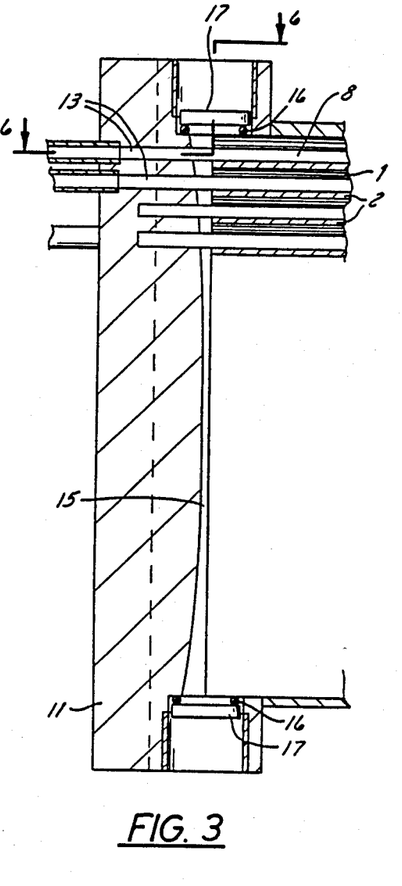
FIG. 3 is a sectional view of the connector taken generally along planes defined by the section lines 3—3 in FIG. 4, the connector being illustrated as engaging a portion of a cell.
Figure 4:
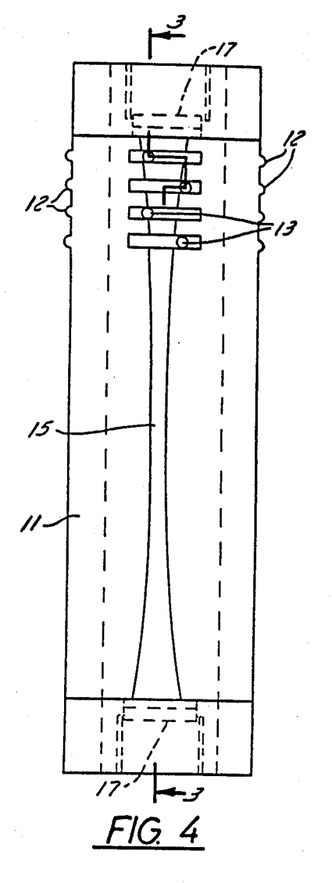
FIG. 4 is a view of the connector surface that interfaces with the anode and cathode distribution channel orifices within the cell recess.
Figure 5A:
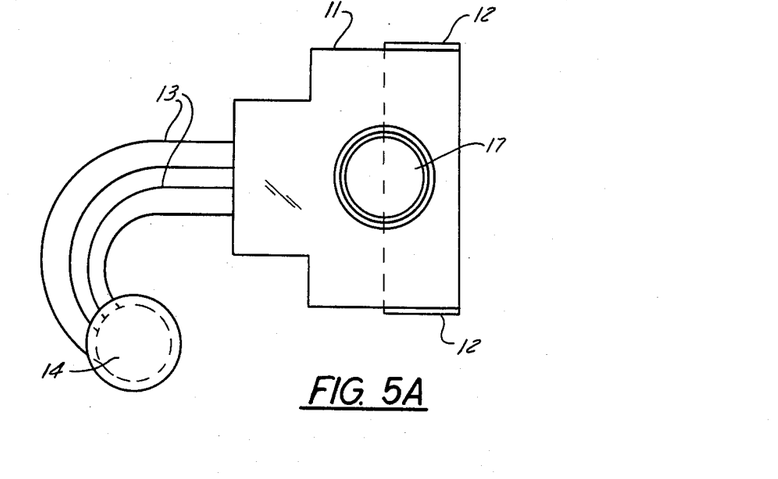
FIG. 5A is a top view of the connector of FIG. 4.
Figure 5B:
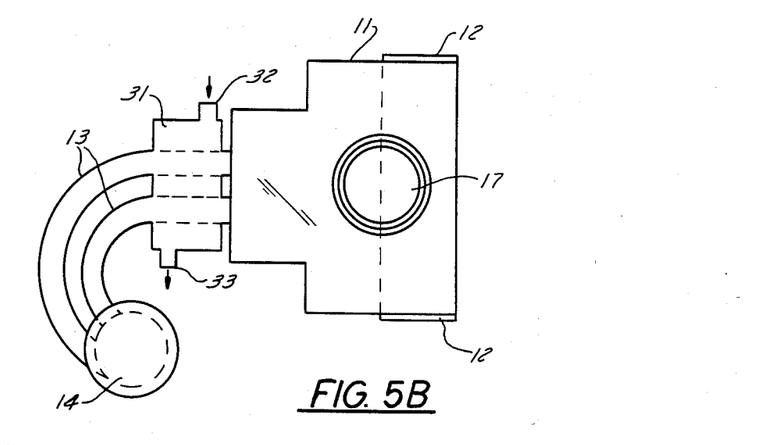
FIG. 5B is a top view of the connector of FIG. 4 but includes a heat exchanger embracing the electrolyte channel connectors.

As can be seen from FIG. 3 and FIG. 4, a cross channel 15 can be provided in the connector 11 with the two ends of the cross channel being closed by an O-ring 16 and a press-fit graphite plate 17. As seen in FIG. 4, the cross channel has a cross-section of varying area, the cross-sectional area decreasing as it approaches the center of the cross channel and then increasing as it approaches each of its distal extremities. A channel can be utilized which has a substantially constant cross-sectional area to attain substantially the same function is hereinafter described.

Figure 6:
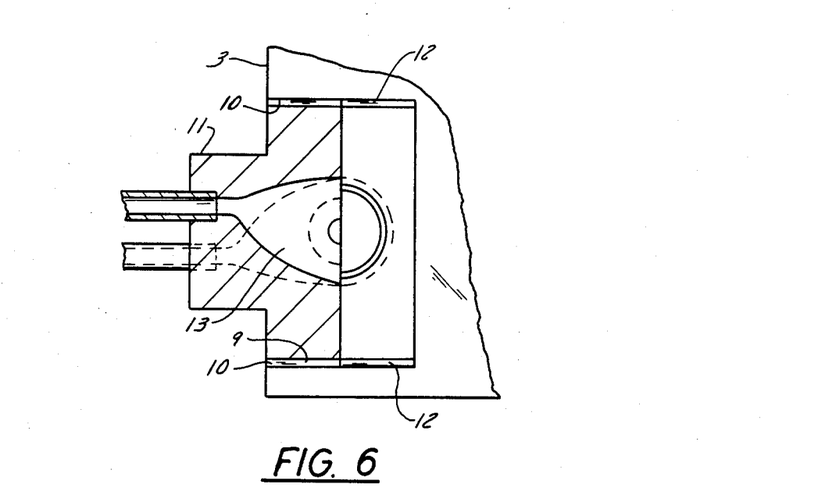
FIG. 6 is a partial sectional view of the connector taken generally along planes of section lines 6—6 in FIG. 3.

As shown in FIG. 4, the channels 13 can be arranged within the connector 11 in an offset manner. As can be seen in the section in FIG. 6, the channels in the connector are shaped so as to widen into a rectangular cross-section at the internal extremity which then corresponds at the interfaces of channel 13 and distribution channel orifice 8 to match the cross-section of the orifices 8. This rectangular cross-section in the collector merges into the circular cross-section of channel 13, and the electrical resistance can be adjusted by the length of the channels which, for example, are formed by attached hose lines or the like.

The connectors can be joined or secured to the assemblage of electrodes and separators in the notches or recesses 9 in a liquid-tight manner either by a snap fit or by their own mechanical clamping devices or by a fused joint.

Figure 7:
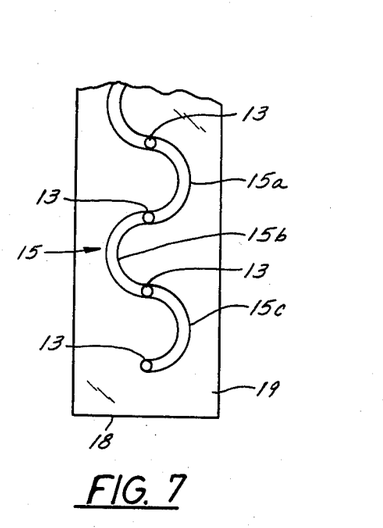
FIG. 7 is a plan view of one of two substantially identical component parts of a second embodiment of a connector wherein the cross channel comprises varying length arcuate segments.

Another embodiment of the connector is illustrated in FIG. 7. The connector 11 comprises two substantially identical component parts 18 having complementing connecting faces or planes 19. The complementing planes or faces 19 are attached by means of reflector welding or heat fusing. A transverse channel which mutually connects the individual channels 13, as for example from an anode space, is formed by arcuate portions 15a, 15b, 15c. These arcuate portions 15a, 15b, 15c are of identical cross section, but each arcuate portion preferably has a differing arcuate length. The arcuate lengths increase in the direction of the middle electrode spaces whereby the resistance between the individual channels is greater in the region of the middle electrodes than it is in the region of the electrodes arranged near the proximal and distal extremities of the cell.

Figure 8A:
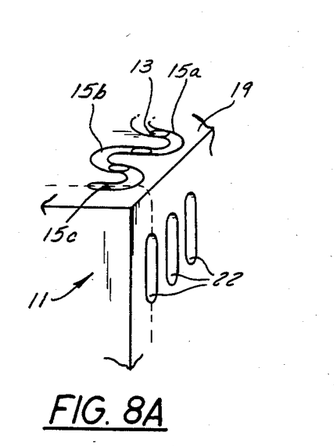
FIG. 8A is a partial view of the connector embodiment of FIG. 7 illustrating controllable channel openings provided therein.
Figure 8B:
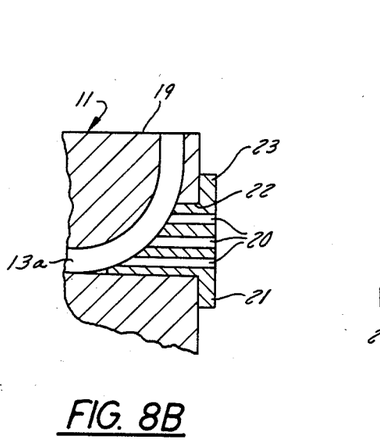
FIG. 8B is a partial sectional view of FIG. 8A showing a curved channel connector and a filler in union therewith to provide the controllable channel opening.
Figure 8C:
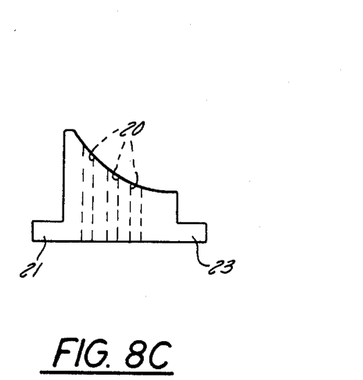
FIG. 8C is a side view of a filler used in FIG. 8B and projecting into and forming the controllable channel openings.

The connector 11 shown partially in section in FIG. 8B has a curved channel connector 13a which leads into further closable channels 20. Part of the wall of the channel connector 13a is angularly disposed or curved in shape and is formed by a filler 21 which has provided therein one or more closable filler channels 20. Filler 21 is shown in a front view in FIG. 8C. Filler 21 is supported in slots 22 of the connector 11 as is illustrated in FIG. 8A. Each of the individual fillers incorporating the closable channels 20 can be arranged on a continuous bar 23 so that all of the slots 22 can be closed by a single filler device. The closable filler channels 20 can be used, for example, for introducing various probes into the electrolye flow. Such probes could be thermocouples, pressure sensors, comparison electrodes, conductivity electrodes, optical sensors and the like. The closable channels 20 also make it possible to intervene actively into the electrochemical process. Such intervention into the electrochemical process could be, for example, by introducing inert flushing gas, gas discharge or the measurement of the velocity of the electrolyte flow. Measuring velocity of the electrolyte flow can be accomplished by introducing gas bubbles into the electrolyte flow and observing the speed of their forward movement into or out of the battery. By means of these closable channels 20, it is possible to construct a diagnostic center for the electrochemical cell without endangering the normal operation of the cell. The filler 21 can also be used as a device for closing the channel connectors 13 so as to enable the operator to separate a particular electrode space from remaining portions of the cell.

Figure 9:
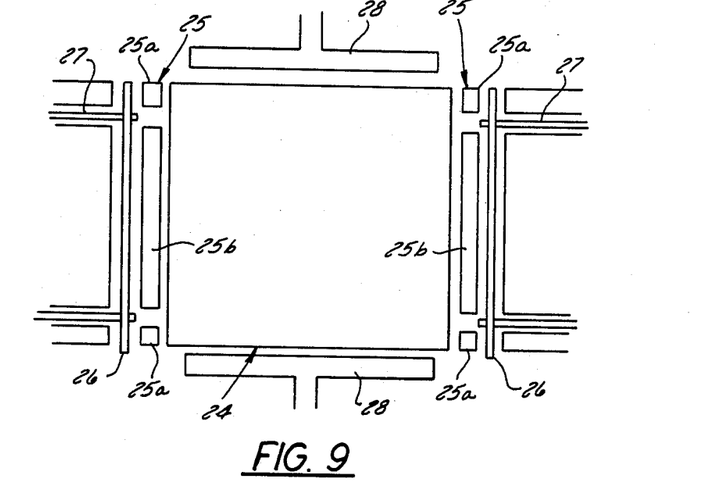
FIGS. 9 and 10 show devices used in the manufacture of the electrochemical cell.

FIG. 9 is a diagramatic illustration of a device utilized for carrying out the process according to the invention. Reference numeral 24 generally illustrates an assemblage of electrodes and separators to be connected together by having their marginal portions melted by the means of a heat platen or heat plate 25. The heat plate 25 is divided into segments 25a and 25b. A plate of themoplastic material 26, for example as a front or stiffening plate, is melted simultaneously. The assemblage of electrodes and separators are pressed against each other by the heat platen or heat plate 25 and ram means 28 during the melting of the marginal portions thereof. Filler pegs 27 coated with a release agent such as Teflon are also provided. The filler pegs provides openings to the channels which serve for feeding and discharging of electrolyte. The filler pegs 27 can be used to provide opening or orifices for connecting hoses by keeping areas of the melted portion free or open during the melting process. After the marginal portions of the electrode and separator assemblage and the stiffening plate 26 have been melted a sufficient extent, the divided heat reflector or heat plate 25a and 25b is moved out of the way and the front plates are pressed against the pack or assemblage, thereby providing a tight joint. During this melting process, a gas discharge channel connecting the cathode spaces can be formed at the same time. This is accomplished by using a wire of a diameter, for example, of 0.5 mm or of triangular or polygonal cross-section being placed upon the pack during the heat fusion. This wire is then pulled out of the melted marginal portions after cooling thereof and provides a channel through which venting of the cells is obtained without electrically connecting them.

Figure 10A:
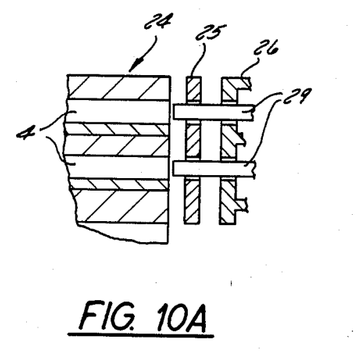
Figure 10B:
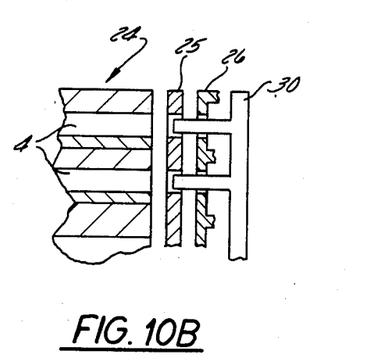
Figure 10C:
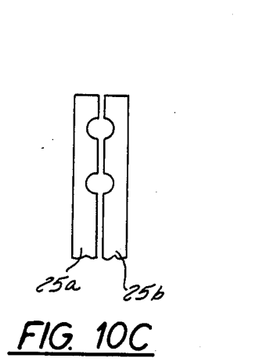

FIGS. 10A, 10B and 10C illustrate the way in which the distribution channels 4 or 5 leading to the electrode spaces are formed during the heat sealing and not closed by the melted marginal portions of the electrodes and separators. This heat fusion process can also be used for producing the connectors 11. In FIG. 10A a welding platen 25 is arranged between the front or stiffening plate 26 and the assemblage of electrode and separators. Teflon hoses 29 are inserted through both the front plate and the welding platen. These Teflon hoses 29 extend into the distribution channels 4 or 5 to ensure that after the divided heat platens 25a and 25b have been moved out, the channels 4 or 5 are not thereafter closed when the partially melted electrode and separator assemblage and front plate are pressed together. In place of the Teflon hoses 29, hoses of thermoplastic material, for example polypropylene, can also be used. These polypropylene hoses can be welded upstream of or in the channels 4 or 5. These polypropylene hoses pass through either a row of bores or a continuous slot in the front plate 26.

In the embodiment illustrated in FIG. 10B, a special comb 30 which is thermally insulated and coated with a release agent is provided in lieu of the Teflon hoses. The comb 30 provides the orifices leading to the distribution channels 4 or 5. The comb projects into distribution channels 4 or 5 during the molten stage of the marginal portions of the electrode-separators assemblage and front plates. The comb is maintained in this position until the molten material is solidified and the pressure on the assemblage and front plate is removed.

What is claimed is:

1. A process for the manufacture of an assemblage of bipolar electrodes and separators each having thermoplastic marginal portions into electrochemical cells utilizing circulating aqueous electrolyte comprising the stages of:
    squeezing the assemblage of electrodes and separators against one another with said thermoplastic marginal portions in an overlapping relationship;
    heating at least a portion of said marginal portions whereby said portion is softened to substantially its melting point to cause said marginal portions to form an enveloping shell; and,
    permitting the melted portions to cool and solidify while continuing to maintain the squeezing pressure.

2. The process of claim 1 comprising the further steps of:
    placing release coated filler pegs between portions of the assemblage marginal portions and maintaining the filler pegs in position during the squeezing, heating and cooling steps; and,
    withdrawing said filler pegs after cooling so as to provide marginal orifice means.

3. The process of claim 1 comprising the further steps of:
    positioning hose-like members between the marginal portions of the assemblage of electrodes and separators prior to squeezing the assemblage; and,
    maintaining said hose-like members so positioned throughout the squeezing, heating and cooling steps.

4. The process of claim 3 comprising the further steps of:
    utilizing hose-like members of thermoplastic material compatible with the material of the marginal portions;
    positioning release coated filler pegs within the hose-like members;
    heat fusing said hose-like members with the assemblage marginal portions;
    maintaining said filler pegs within the hose-like members throughout the squeezing, heating and cooling steps; and,
    withdrawing said filler pegs upon completion of the cooling step.

* * * * *